455-613 AU 233 EX

FIP8106 XR 3,863,063

1300/C X5010 D

United Stat[es Patent]

Indig et al.

[11] 3,863,063

[45] Jan. 28, 1975

[54] OPTICAL COMMUNICATIONS SYSTEMS

[75] Inventors: George Sanford Indig, Bernards Twsp., Somerset County; Peter Michael Rentzepis, Millington, both of N.J.

[73] Assignee: Bell Telephone Laboratories, Incorporated, Murry Hill, N.J.

[22] Filed: June 1, 1973

[21] Appl. No.: 365,768

[52] U.S. Cl. .................................................. 250/199
[51] Int. Cl. .............................................. H04b 9/00
[58] Field of Search.................... 250/199; 350/96 R; 329/144; 330/4.3, 4.5

[56] References Cited

UNITED STATES PATENTS

| | | | |
|---|---|---|---|
| 3,459,466 | 8/1969 | Giordmaine | 350/96 R |
| 3,717,769 | 2/1973 | Hubbard et al. | 250/199 |

*Primary Examiner*—Robert L. Griffin
*Assistant Examiner*—George H. Libman
*Attorney, Agent, or Firm*—G. S. Indig

[57] ABSTRACT

The material or wavelength dispersion limit on bandwidth in an optical communications system, perhaps utilizing a glass transmission line, is minimized by pulse sharpening. Sharpening is accomplished by first spreading the wavelength components within the pulse, for example, by use of a grating; by delaying long wavelength components relative to short wavelength components, for example, by use of an echelon; and finally, by reconstituting a pulse from the now reordered wavelength components. Wavelength dispersion limits are most significant at this time where mode dispersion is minimized or eliminated by virtue of graded index lines or by use of single mode lines.

15 Claims, 3 Drawing Figures

T – R –
Transmission line
LED or Laser

OPTICAL COMMUNICATIONS SYSTEMS

BACKGROUND OF THE INVENTION

1. Field of the Invention

The invention is concerned with optical communications systems, that is, systems operating with carriers within the wavelength range of from 500 μm to 1,000 Angstrom units. More particularly, the invention is concerned with such systems utilizing glass transmission lines or lines of other material showing material (or wavelength) dispersion.

2. Description of the Prior Art

With the advent of the laser and the light emitting diode (LED), optical communications was given an impetus which has continued without abatement to the present day. Many elements for optical communications systems have been developed to an advanced level. These include: modulators; non-linear elements, such as, second harmonic generators and parametric oscillators; isolators, etc. Arrangements for taking advantage of the broad bandwidth which is inherent in optical systems are under study. Proposed arrangements include multiplexing and heterodyning, and modulation or multiplexing may depend on shifts in time, amplitude, phase, or frequency.

As systems development approaches commercial fruition, a variety of problems uniquely associated with optical wavelengths have been recognized. One such problem involves dispersion in real transmission media.

Transmission lines of a variety of types are under study, and many have reached pilot plant level. A popular approach at this date involves a glass core, which is clad, usually also with glass but of lesser refractive index than the core. Glass lines take a variety of forms. They may be single mode with core dimension so small as to permit efficient transmission of but a single transverse mode; they may be multimode—i.e., with sufficient core dimension to permit propagation of a number of transverse modes—typically many thousands.

Multimode fibers are of particular interest to many workers because of the nature of the carrier generator. Even coherent oscillators, particularly junction lasers, but most other lasers as well, emit a large part of their output in the form of transverse modes of higher order than the fundamental. Incoherent generators, such as the forward-biased gallium arsenide LED, now considered a prime candidate for near future systems use, result in an even larger fraction of output energy in higher order modes. Particularly for miniaturized systems, which have generators associated with one or small numbers of lines, it is vital from the economic standpoint to introduce as large a fraction of available energy as possible into the line. Any attempt to couple a single mode fiber to an LED or to the usual laser structure would result in utilization of only a small fraction of available energy—a fraction perhaps as small as $10^{-3}$ or less.

Multimode fiber constructed of a glassy material should typically have a core diameter approaching 100 μm to have the capability of carrying the number of modes necessary to effectively utilize the output of an LED or of a multimode laser. To contain the energy within the core, a cladding material should have a refractive index perhaps one or a few percent less than that of the core. Such a configuration necessary on the one hand to utilize available power and on the other to contain such power within the transmission line gives rise to dispersion due to the difference in velocity of different transverse modes through the line. This dispersion for a simple line of the type described is a function of the product of traversal time for wave energy within the line and the differential refractive index between core and clad. So, for example, for a silica line, transit time is approximately 5 microseconds per kilometer; and a one or two percent change in refractive index between core and clad results in a mode dispersion which is one or two percent of 5 microseconds for each kilometer or approximately 50 or 100 nanoseconds per kilometer.

Mode dispersion, a significant limitation on bandwidth due to envelope spreading—for example, pulse spreading in a PCM system—may be lessened. It has been shown that there is some inherent lessening due to (1) the fact that larger angle modes—i.e., high order modes—suffer significant loss through diffraction, and (2) due to mode mixing involving some kind of mode conversion under the influence of the line itself. As a result, it has been found that mode dispersion does not scale linearly with distance in the medium. There is evidence that mode dispersion scales approximately as the square root of distance.

Proper grading of the refractive index results in a further lessening of mode dispersion. Optimum grading is parabolic with the peak value occurring at the geometric center of the line and with a minimum parabolic value occurring at some distance from the center but still within the body of the line. It is the general view that the index should not be graded all the way but should be flat for some distance extending radially to the free surface of the clad. Measured mode dispersion values in lines of this design indicate a dependence on the second power of the index differential between the two extreme parabolic values. Mode dispersion for a properly graded line is then approximately equal to the product of delay time—e.g., 5 microseconds per kilometer and $0.01^2$ or $5 \times 10^{-4}$ microseconds per km (0.5 nanosecond/km) for a line having extreme index values with a differential value which is one percent of the core value. This represents a gain of approximately two orders of magnitude over the dispersion value that might be expected in a clad line having a step junction between two flat core and clad profile portions. This value, too, is not expected to scale linearly with distance but rather as the square root of distance due, again, to loss of high order modes and to mode mixing. Based on fundamental considerations, it has been estimated that an optimum graded multimode fiber will have a mode dispersion which is approximately one-eighth of that indicated.

It is evident that there are circumstances under which mode dispersion is not a significant limitation on bandwidth even using a multimode line. Based on the above, for example, an optimum focusing line might result in as little as of the order of 1 nanosecond spreading in a 10 kilometer length line. To a first approximation, this is equivalent to a bandwidth of the order of a gigahertz or to a permitted pulse repetition rate of 1 gigabit per second. Ten kilometers is at this time considered a reasonable spacing between repeaters.

Under circumstances including those in which mode dispersion is no longer a significant limitation on bandwidth, a different type of dispersion—wavelength dispersion—may become significant. Silica, like other real materials, when measured in wavelength regions showing no anomalous dispersion, evidences increased velocity for longer wavelength energy. Many media evidence a wavelength dispersion of the order of five percent over the visible spectrum. This is equivalent to a wavelength dispersion of approximately one percent for the 300–400 wave number band emission of a gallium arsenide forward-biased LED. Wavelength dispersion from this type of source is, therefore, again of the order of 50 nanoseconds per kilometer. This dispersive effect scales linearly with distance so that wavelength dispersion may be expected to be of the order of 500 nanoseconds for a 10 kilometer line. This type of dispersion, and its resultant spreading, is not rectified by index grading and is unaffected by core diameter. Wavelength dispersion from such a broadband source, therefore, imposes a bandwidth limitation of approximately 5 megabits per second for substantially complete utilization of the entire LED output. Wavelength dispersion may be an important limiting factor even for a system utilizing a laser oscillator. So, for example, use of a gallium arsenide diode heterojunction laser with an output of the order of 10 wave numbers in bandwidth may result in a wavelength dispersion bandwidth limitation of 0.5 megahertz. Obviously, where a true single mode line is used, mode dispersion is precluded; and in the absence of non-linear effects and dispersive limitation must arise from wavelength dispersion. Single mode lasers are a reality and the possibility of a communications system based on this approach is not to be discounted.

SUMMARY OF THE INVENTION

In accordance with the invention, the dispersion limit on bandwidth imposed by wavelength dispersion of the transmission line is reduced. In essence, reduction takes the form of wavelength reordering in a direction opposite to that brought about by ordinary non-anomalous wavelength dispersion. Such reordering is accomplished by introducing variable delay times with longest delay corresponding with the longest wavelength component of the energy being transmitted through the line. In its simplest form, this reordering may be merely sufficient to delay long wavelength components relative to the short, and therefore sufficient to reconstruct an envelope of the approximate time duration and shape of that which was launched either at the preceding repeater position or at the transmitter. Alternatively, reordering may over-compensate for wavelength dispersion in the line and actually result in a broadened envelope in which short wavelength components precede long. Such an artificially broadened pulse undergoes sharpening during an initial period of traversal in the line and ultimately redisperses in the normal fashion. Where wavelength dispersion is the primary limitation on bandwidth, e.g., where signal-to-noise ratio is maintained at a feasible level, inter-repeater spacings may be duplicated by such over-compensation through reordering. Other variations are apparent. It is no requirement that the system be optimum—that is, that the original pulse shape be precisely replicated. Nor is it required that over-compensation be sufficient to result in a degree of broadening exactly equal to that resulting from normal dispersion for a particular repeater spacing. Since wavelength dispersion for a band of concern may not be strictly linearly dependent on wavelength, an optimum system may utilize delays which are similarly non-linear.

Delays responsible for reordering may be produced by use of dispersive media such as glass or liquid with discrete path lengths assigned to different wavelength portions or reordering may be brought about in a continuous fashion by use of apparatus resulting in a continuously varying path length through air or other medium.

In any event, the first requirement of the inventive teaching is that the dispersed energy be spatially spread in terms of wavelength. While this may be accomplished in a variety of ways, probably the most expedient involves use of at least one grating (prisms may also serve but wavelength discrimination particularly for narrow band sources may be less satisfactory). Once spatial separation of wavelength components has been accomplished, it is next necessary to impose wavelength dependent delay times on the components. This is most easily visualized in terms of an echelon or of a plurality of discrete bodies of differing index and/or length so arranged that traversal time is larger for long wavelength components. As an example, replication of an envelope of a spectral width of from 300–400 wave numbers which requires a differential delay time of approximately 500 nanoseconds (for a typical 10 km glass line) may be accomplished with graded path lengths of a maximum of about 100 meters. Such a configuration is based on a refractive index of about 1.5 and may take the form of coiled transmission lines with the number of coils corresponding with a desired number of wavelength components. This example is based on available silica line and on the broad band source noted. Higher index, narrower bandwidth, or smaller repeated spacing may result in shortened maximum traversal distance. So, for example, a 10 wave number source using paths defined in a medium having a refractive index of 3 and still with a 10 kilometer inter-repeater spacing may result in maximum traversal path length of the order of 1 meter—a dimension feasible in an echelon.

The invention is applicable to pulsed as well as continuous wave systems and in either event to those depending upon amplitude, phase, or frequency modulation. Accordingly, the term "envelope" is utilized broadly to define an energy packet having a time coordinate and a second coordinate which is one or another of the modulation parameters. Such packets may be substantially isolated one from another as in a PCM or other pulse system, or may constitute modulation packets produced on a cw stream.

DETAILED DESCRIPTION

1. Terminology

Figure 1:
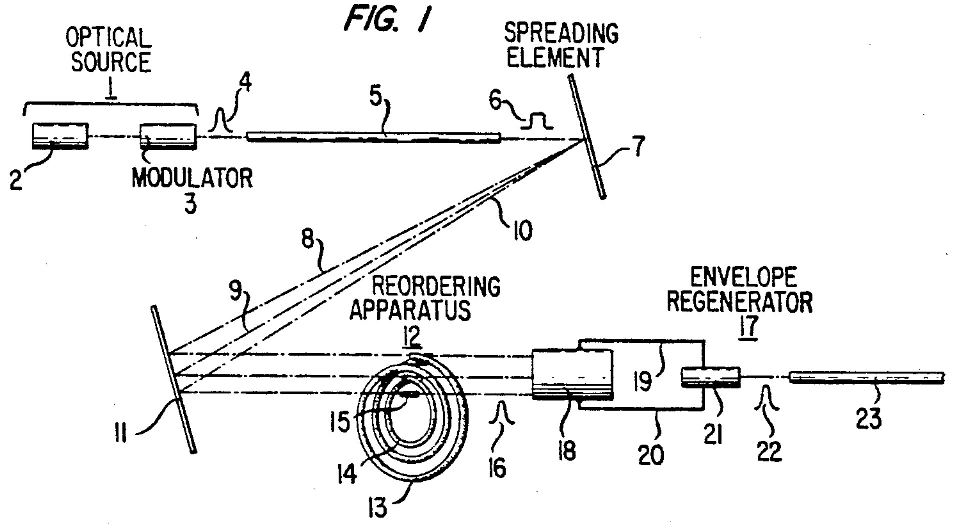
FIG. 1 is a schematic representation of a communications system in accordance with the invention in which variable path length is that of discrete bodies of material.

The invention is described in terminology which is sometimes representative or simplistic. While this is a suitable tutorial approach, it is appropriate to set forth the meanings within the context within which such terms are used.

Optical Source: refers to apparatus for both producing optical wave energy—i.e., energy within the wavelength range of from 500 μm to 1,000 Angstrom units—as well as means for modulating such optical energy so as to impose "intelligence" information. In general, optical energy is first generated by means, for example, of an incoherent source, such as a light emitting diode (LED), or a coherent source, such as a laser. The laser may be of any form; although for the purpose of the invention, it is likely to be of relative broad spectral band (i.e., approaching or exceeding a wave number). One form of laser beneficially included within a system of the type described is a junction laser such as a heterojunction gallium arsenide laser. An alternate form of laser which results in broad band emission is a dye laser. Under certain circumstances, other types of laser oscillators may be utilized. Examples are: light pumped solid state and electrically pumped ion lasers. In general, however, spectral bandwidth, particularly of ion lasers, is sufficiently narrow such that wavelength dispersive effects of concern in this invention may not be limiting.

The generator included in the optical source may be in such form as to emit a continuous wave or as to have a pulsed output. Pulses may be the result of intrinsic operation of the generator itself as, for example, in a Q-switched, mode-locked, or cavity-dumped configuration; or they may be produced by interruption of a cw stream; the latter, for example, by means of a shutter—e.g., electrooptic, magnetooptic, or acousto-optic. In the instance of a junction device, either incoherent or coherent, pulsed emanation may be brought about by pulsing the electrical pump.

Imposition of intelligence on the optical energy produced by the generator may be the result of change in amplitude, frequency, or phase and, as indicated, may operate on an already pulsed or cw stream. In the instance of a pulsed system, modulation may take the form simply of omission of specified members of the stream; and this may be accomplished again at an early stage as by controlling a pump source or at a later stage by means of an ancillary modulator.

The type of information imposed on the carrier may be of any variety, e.g., it may correspond with voice or other audible signal; it may be pictorial; it may be designed for machine consumption as computer data; it may even come about as the result of a material property—e.g., as spectroscopic information due to transmission through a specimen.

Transmission Line: in this context is a dispersive line, that is, one constructed of a material evidencing a varying velocity dependent upon wavelength. The primary purpose of the transmission line is transmission over appreciable distances; for these purposes, distances sufficient that wavelength dispersion becomes a limit on bandwidth. Lines contemplated are, therefore, at least hundreds of meters in length.

Since the fundamental purpose of the invention is to minimize wavelength dispersion, it follows that the nature of the line should be such that wavelength dispersion is a real limit. Competing limits worthy of note are loss—absorption and/or scattering—and mode dispersion. On the thesis that signal-to-noise ratio may be reduced of the order of 100 dB and that interrepeater spacing of the order of kilometers are practical, losses due to absorption and/or scattering are characteristically 10 dB/kilometer or less.

The other limit, mode dispersion, is most easily avoided by use of a single mode line. Such lines which characteristically have a core diameter of a very few micrometers are most effectively utilized in conjunction with single mode lasers although there are circumstances where economic considerations might dictate use of such a line with a multimode source. Multimode lines—i.e., lines capable of supporting a plurality of modes typically more than $10^2$—are suitably used so long as wavelength dispersion is a significant limit. The obvious example of an appropriate situation is one in which the multimode line is so designed as to decrease mode dispersion—i.e., through a graded index of refraction with a peak level at the center of the core. The question of suitability of the line is interdependent on the source; so that a source which is broadband, for example, the 300 to 400 wave number gallium arsenide LED, may result in a wavelength dispersion limit being imposed on a system which with a narrow band source would be primarily mode dispersion limited.

Typical lines of primary interest at this time are constructed of normally solid, transparent, glassy materials—for example, silica, or silica so modified as to tailor its refractive index to the needs of the line. Such lines are ordinarily clad with materials which have an average index of refraction lower than that of the average index of the core. The term "average" is used here to provide for graded index structures. The lowered index is required in the clad to perform the guiding function of the line and relative index values have an effect on mode dispersion, as indicated in the summary. The magnitude of mode dispersion, typically, depends upon the fractional differential index, with such dispersion increasing as some power of the fractional differential—generally a power of between ½ and 1.

It is characteristic that a relatively large fraction of the lowest order mode is carried in the clad, and so lines of any given material are likely to be of the same general overall dimensions regardless of whether single mode or multimode. Typically, a characteristic line may be approximately 100 μm in overall diameter with all but perhaps 2 μm of this overall dimension representing clad in the instance of a single mode line, and with perhaps 80 or 90 μm representing core in the multimode line.

Spreading Element: refers to the element/s designed to produce a spatial separation of optical energy extracted from the line in terms of wavelength. Generally, such element takes the form of one or more gratings or prisms. The effect of either is to produce an angular displacement which varies with wavelength. While this is the primary function of such an element and while it may take any of the traditional forms so that, for example, gratings may be reflecting or transmitting, absorbing or refracting, such element may be modified to accomplish some special purpose. For example, a prism or grating may be curved to maintain some desired spread between wavelength components and such curvature may be complex to accommodate a non-linear dispersion.

Reordering Apparatus: is that element or combination of elements which introduces a wavelength dependent delay for different wavelength components produced by the spreading element. Such delays may result in envelope compression or may be carried to such length as to result in an envelope which is time spread with respect to that produced by the source, however, with a wavelength component order which is inverse to that brought about by the dispersive medium (with short wavelength components preceding long wavelength).

Reordering apparatus is generally dependent upon path lengths which vary physically for different wavelength components, although a similar effect may be accomplished by variation of refractive index. In either case, increased delay time, whether due to greater physical length or larger index, corresponds with shorter wavelength components. Exemplary forms are fiber coils (possibly identical to the transmission line) with coil length—perhaps corresponding with number of turns—greater for shorter wavelength components. An alternative form of apparatus may utilize an echelon, although required reordering, at least for broad band source, generally requires dimensions which are awkward. Still a different form may depend upon varying length through air or other ambient atmosphere accomplished by means of mirrors or refracting elements.

Envelope Regenerator: is that element or combination of elements which processes the output from the reordering apparatus so as to produce a desired envelope. Where the regenerator is at a repeater position, the envelope produced is of optical energy and may resemble that produced by the optical source at the transmitter. Where it serves at a terminus, its output may take a different form, for example, that of an electrical impulse which may then undergo whatever processing is required by suitable ancillary equipment—e.g., demodulation, demultiplexing, etc. The envelope regenerator may be an all optical system wherein a reordered optical envelope extracted from the reordering apparatus is, itself, amplified as, for example, by means of a laser amplifier. Alternatively, the envelope regenerator may include a detector which converts the optical reordered pulse into an electrical impulse which may then be utilized to produce a higher peak optical replica, for example, by electrical pumping of a laser or LED. Suitable detectors include semiconductor detectors, bolometers, and pyroelectric detectors. If at a repeater position the output of the envelope regenerator is again introduced into a transmission line, other elements include well known reflecting and refracting devices for altering spatial relationship of beams or components, for collimating and for coupling—(e.g., taking the form of a trumpet-shaped body for gathering component waves and reintroducing into a line). Any or all elements may have anti-reflection coatings, may be introduced into the system at Brewster's angle, or may be otherwise modified so as to minimize losses.

Other Terminology: "Initial Envelope" has reference to the envelope in whatever terms as introduced into a transmission line either at the transmitter or at a repeater position. "Reordered Envelope" has reference to the envelope leaving the reordering apparatus. As described, the term "envelope" is here used in the general sense of describing a packet of energy defined in dimensions of time and amplitude or frequency or phase. "Wavelength Dispersed Envelope" is the envelope as extracted from the transmission line prior to spreading.

2. The Drawing

FIG. 1 is a schematic representation of a system including an optical source 1 which, in this instance, is made up of generator 2 and modulator 3. Other elements, as for multiplexing, etc., may be included. Generator 2 may be an LED or a laser or other light source. Modulator 3, depicted as a separate element, may operate at any of the usual optical interactions. The function of modulator 3 may, as indicated, be served simply by modulating generator 2 directly as, for example, by varying the magnitude of an applied biasing current. Resulting initial envelope shown schematically as envelope 4 is introduced into transmission line 5 which may take the form of a clad glassy line, as discussed. The wavelength dispersed envelope 6 shown schematically is made incident on, or introduced into, spreading element 7, here depicted as a reflection grating to produce angular spreading schematically represented in the form of rays 8, 9, and 10. For the arrangement shown, ray 10, representing the greatest angular displacement from the incoming envelope 6, is the shortest wavelength component. These three rays, representative of the generally larger number used in practice, are, in the apparatus shown, reflected by mirror 11 so as finally to be introduced into reordering apparatus 12, here shown as including three lengths of fiber 13, 14, 15. Coil-shaped fiber 13 is relatively long and, therefore, results in the largest delay time of the three. This delay is introduced for the longest wavelength component corresponding with ray 8 and consequently delays this now leading component relative to the components represented by rays 9 and 10. Coiled fiber 14 is of lesser length than 13; and fiber 15, of still lesser length, is depicted as a straight length of material. The now reordered envelope which may resemble envelope 4, in which event it may take the form of envelope 16, is next introduced into envelope regenerator 17 which includes, in this instance, a detector such as a photomultiplier 18 which has an electrical output transmitted through wires 19 and 20 which bias an optical generator 21 which may, for example, be an LED or a heterojunction laser. The "amplified" envelope 22, possibly replicating envelope 4, is next introduced into transmission line section 23 which may be identical in form to line 5. The apparatus depicted represents but a portion of an overall system which may include any number of repeaters and, finally, a receiver, each of which may resemble or be identical to elements 7 through 21.

Figure 2:
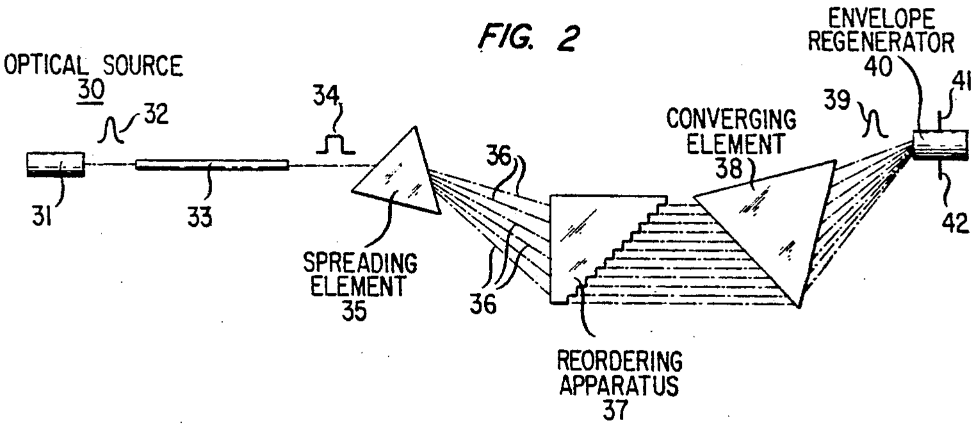
FIG. 2 is a schematic representation of an alternative system in accordance with the invention in which component reordering is brought about by use of an echelon.

FIG. 2 depicts apparatus alternative to that of FIG. 1. In this instance, optical source 30 is represented by a generator 31 provided with modulation means not shown. Generator 31 may, for example, be a heterojunction, semiconductor laser. In any event, the output of generator 31 schematically depicted in the form of envelope 32 is introduced into transmission line 33 and extracted as wavelength dispersed envelope 34. Such extracted envelope is next introduced into spreading element 35 shown in the form of a prism. Element 35 angularly displaces wavelength components schematically represented as rays 36 which are, in turn, made incident on reordering apparatus 37, in this instance shown as a transmission echelon. The dispersive nature of a prism is such that angular displacement is greater for relatively short wavelength components. Since the normal dispersive material of line 33 manifests an increased refractive index for such shorter wavelength components, these components lag longer wavelength components. Reordering apparatus 37 is, in consequence, so arranged as to produce increasing delay for increasing wavelength. Output from reordering apparatus 37 is, for the arrangement depicted, introduced into converging element 38 shown in the form of an inverted prism which focuses the reordered envelope shown as envelope 39 on envelope regenerator 40. Regenerator 40 may be a junction laser biased through leads 41 and 42 at a level just below threshold. If regenerator 40 is at a repeater position, its output is next introduced into a transmission line section not shown. Alternatively, where regenerator 40 is at a receiver position, it may be a detector and/or transducer, and so may perform the function of converting optical to electrical energy.

Figure 3:
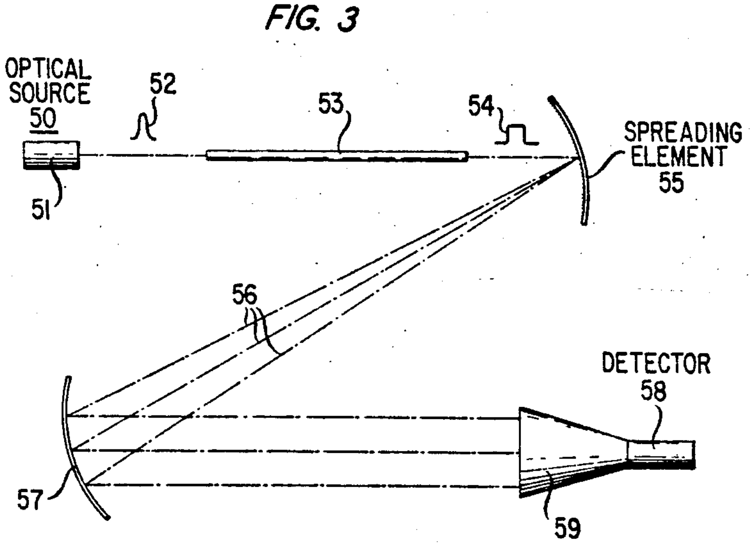
FIG. 3 is still a different system variation in which reordering results from differing path length in a medium which may be air or other ambient.

The apparatus of FIG. 3 accomplishes reordering through varying path length for different wavelength components in the atmosphere. This apparatus includes optical source 50 which may be a laser 51. Optical source 50 provided with modulation means not shown results in envelopes, such as are schematically represented by envelope 52, which are introduced into dispersive delay line 53. Extracted envelopes represented by dispersion-broadened envelope 54 are made incident on the spreading element 55 here depicted as a concave reflecting grating. Angularly spread wavelength components represented by rays 56 are made incident on element 57 which may be a simple concave mirror or possibly a mating grating. In any event, element 57 collimates or focuses rays 56 and introduces them into detector 58 here by means of trumpet-shaped end coupling element 59. Reordered envelope information is then processed by detector 58 and/or by ancillary apparatus not shown in a manner appropriate for the remainder of the system. Where this involves a plurality of repeaters output from detector 58 presumably amplified, for example, by a laser amplifier of the same general characteristics as the laser oscillator included in optical source 50, is introduced into a section of transmission line not shown. Alternatively, output from detector 58 is processed by terminal apparatus which may or may not require a transducer to convert optical to some other form of energy, or possibly just to impedance-match to the following elements.

The apparatus arrangement in FIG. 3 is representative of combinations of refracting and reflecting elements, such as, gratings, prisms, mirrors, reflecting and refracting echelons, etc., in which delay time comes about by virtue of varying path length through ambient. Such systems, by their nature, are most useful for use with a relatively narrow bandwidth optical source. Broader bandwidth sources are more easily processed by use of media having higher refractive indices using arrangements, for example, as depicted in FIG. 1 or 2.

3. Operating Characteristics

These considerations have been discussed in the summary. The inventive arrangement contemplates systems in which useful bandwidth is limited by wavelength dispersion. It has been indicated that primary competing limiting mechanisms are insertion loss and mode dispersion. It has been indicated that under usual circumstances, wavelength dispersion may be a significant limitation for lines having an insertion loss of about 10 or 20 dB/kilometer or lower. This level is well within present capability, and glass lines evidencing insertion loss as low as 2 dB/kilometer at infrared wavelengths have been demonstrated. Since scattering losses and certain attendant absorption losses increase for higher frequencies, this number is increased to somewhat higher levels at shorter wavelengths, for example, in the visible spectrum.

The illustrative insertion levels discussed are for silica or modified silica lines having essentially constant refractive index across the core and of sufficient core dimension to be multimode. Mechanisms responsible for measured insertion losses are not altered for single mode designs or for focusing multimode lines.

The invention requires that the transmission media be dispersive. This is a characteristic of any medium which is transparent to optical wave energy. Wavelength dispersion to an intrinsic characteristic and is invariably present in any real media to the extent required. Under many circumstances a wavelength dispersion of approximately one percent over the visible spectrum—i.e., from about 3,000 to 7,000 Angstrom units is adequate to cause a degree of dispersion which may be a limiting factor on useful bandwidth.

It has been indicated that mode dispersion is a significant limitation under many circumstances. In a flat profile index multimode fiber, mode dispersion is approximately equal to the product of the fraction of the differential index between core and clad divided by the core index, and the transit time for the wave energy of concern. For a silica line, transit time is approximately 5 microseconds/kilometer. A one percent refractive index differential is fairly representative of a differential index between clad and core useful for guiding the energy in the line so that mode dispersion for such a line is approximately 50 nanoseconds per kilometer. It has also been indicated, however, that measured values indicate that this dispersion does not scale linearly with distance but rather with some power which may be closer to ½. This somewhat lessened mode dispersion is generally attributed to two factors: loss of larger angle higher order modes; and mode mixing. The latter contemplates mode conversion due to perturbations of one type or another, for example, compositional inhomogeneities or configurational variations. If one assumes random mode conversion, the statistical dependence of mode velocity is proportional to the square root of distance. For an assumed 10 kilometer inter-repeater spacing, a flat profile multimode fiber evidencing a mode dispersion of 50 nanoseconds per kilometer, mode dispersion may be expected to increase to from 150 to 200 nanoseconds.

Focusing lines evidence mode dispersion which is appreciably less. Attained approximations of parabolic index grading having resulted in mode dispersion which is the product of transit time and clad-core fractional index differential to the second power. For a one percent differential, this results in a mode dispersion per kilometer in a silica line of approximately $5 \times 10^{-6}$ sec $\times 10^{-4}$ or about 0.5 nanosecond/kilometer. Extrapolating this value to 10 kilometer inter-repeater spacing indicates a total mode dispersion of from 1.5 to 2 nanoseconds. It has been indicated that optimization of graded structures results in still further lessening of mode dispersion, ultimately attaining a level of about one-eighth that indicated.

Conditions under which wavelength dispersion is a significant limitation on bandwidth are determined on the basis of the above considerations, on the spectral width of the optical source used, and, of course, on the material dispersion of the transmission line medium. It is realistic to consider a wavelength dispersion of about five percent over the visible spectrum. This is equal to about one percent for the 300 to 400 wave number bandwidth of a gallium arsenide LED. Accordingly, wavelength dispersion, regardless of transmission line structure (multimode or single mode), is for that source about 50 nanoseconds/kilometer. This type of dispersion scales linearly as distance and is, therefore, equal to about 500 nanoseconds for the assumed 10 kilometer inter-repeater spacing. The bandwidth limit so imposed is consequently about 5 or 6 megahertz. The 10 Angstrom unit bandwidth of the usual heterojunction laser results in a wavelength dispersion about 1/50 as great as that for the LED or about 0.1 nanosecond per kilometer (1 nanosecond for 10 kilometers).

Differential delay times required in reordering apparatus are, for extreme wavelength components, equal to those indicated. For an artifically dispersed envelope in which short wavelength components precede long, and assuming an opposite dispersion approximately equal to that introduced by 10 kilometers of line, differential delay time in the reordering apparatus is twice as great as that indicated.

Assuming a refractive index of about two, a delay time of 50 nanoseconds may be introduced by 1.5 meters of material. Reordering apparatus would, in consequence, be so arranged as to have a plurality of paths over a range of from 1.5 meters to 0 or whatever shortest length is required to make interconnection. Delay times of this order are most easily introduced by reordering apparatus of the type shown in FIG. 1. Echelons are a practical expedient for the narrower band sources so that an echelon of an index of 3 may be used to reorder the 10 Angstrom unit band envelope of a heterojunction diode with a longest dimension of about one meter.

What is claimed is:

1. Optical communications system including a first means for producing optical wave energy within the wavelength range of from 500 micrometers to 1,000 Angstrom units; second means for modulating such wave energy so that said first and second means together result in exiting envelopes representing energy packets having a first time dimension and a second dimension selected from the group consisting of amplitude, frequency, and phase; a transmission line for transmitting such envelopes a distance of at least 100 meters, said line evidencing wavelength dispersion; third means for extracting said envelopes from the said line at at least the said distance from the said first and second means; and fourth means for processing such extracted envelopes, characterized in that there is interposed between said second means and said fourth means equipment including both a spreading element for angularly displacing envelope energy so as to produce component envelopes of differing wavelength content and evidencing differing angular displacement dependent upon wavelength and reordering apparatus for introducing differing delay times for different component envelopes, with longer delay times for longer wavelength components, so that the time displacement introduced by the transmission line for different wavelength portions of the envelope energy is at least partially compensated by the said reordering apparatus.

2. System of claim 1 in which the spreading element includes at least one grating or prism.

3. System of claim 2 in which the reordering apparatus includes material of a refractive index greater than unity.

4. System of claim 3 in which the reordering apparatus consists essentially of a plurality of bodies of the said material.

5. System of claim 4 in which the said bodies are fibers.

6. System of claim 5 in which the fibers are coiled.

7. System of claim 6 in which the coiled fibers are sections of a clad transmission line.

8. System of claim 7 in which the said first means includes a light emitting diode.

9. System of claim 3 in which the said medium is in the form of an echelon.

10. System of claim 1 in which the said first means includes a light emitting diode.

11. System of claim 1 in which the said first means includes a laser.

12. System of claim 1 in which the said second means includes electrical biasing means for energizing the said first means.

13. System of claim 1 in which there is a plurality of sets, each set consisting of a said spreading element, a reordering apparatus, and a third and fourth means with such sets being spaced one from another along a transmission line.

14. System of claim 13 in which the spacing between sets is several kilometers.

15. System of claim 1 in which variable delay in the reordering apparatus corresponds with differing path lengths through ambient.

* * * * *

UNITED STATES PATENT OFFICE

CERTIFICATE OF CORRECTION

PATENT NO. : 3,863,063

DATED : January 28, 1975

INVENTOR(S) : George S. Indig and Peter M. Rentzepis

It is certified that error appears in the above-identified patent and that said Letters Patent are hereby corrected as shown below:

Column 3, line 27, change "and" to --any--.

Column 10, line 14, change "to" to --is--.

Signed and Sealed this

*seventh* Day of *October 1975*

[SEAL]

*Attest:*

RUTH C. MASON
*Attesting Officer*

C. MARSHALL DANN
*Commissioner of Patents and Trademarks*